(12) United States Patent
Oh et al.

(10) Patent No.: US 11,788,901 B2
(45) Date of Patent: Oct. 17, 2023

(54) HIGH-SENSITIVITY TEMPERATURE SENSOR AND METHOD OF MANUFACTURING THE SAME

(71) Applicant: Korea University Research and Business Foundation, Seoul (KR)

(72) Inventors: Soong Ju Oh, Seoul (KR); Jun Sung Bang, Goyang-si (KR)

(73) Assignee: Korea University Research and Business Foundation, Seoul (KR)

( * ) Notice: Subject to any disclaimer, the term of this patent is extended or adjusted under 35 U.S.C. 154(b) by 429 days.

(21) Appl. No.: 17/074,821

(22) Filed: Oct. 20, 2020

(65) Prior Publication Data

US 2021/0116310 A1    Apr. 22, 2021

(30) Foreign Application Priority Data

Oct. 21, 2019   (KR) .......................... 10-2019-0130796

(51) Int. Cl.
*G01K 7/00*    (2006.01)
*G01K 7/18*    (2006.01)

(52) U.S. Cl.
CPC .................................. *G01K 7/186* (2013.01)

(58) Field of Classification Search
CPC ........... G01K 7/186; G01K 7/18; G01K 7/16; G01N 27/127; H01B 1/02; H01B 5/14
See application file for complete search history.

(56) References Cited

U.S. PATENT DOCUMENTS 9,460,824 B2 * 10/2016 Liu ........................ H01B 1/02
10,054,496 B2   8/2018 Hong et al.

FOREIGN PATENT DOCUMENTS

KR   10-2019-0001062 A   1/2019
KR   10-2019-0054747 A   5/2019
(Continued)

OTHER PUBLICATIONS

Seung-Wook Lee et al. "Transition States of Nanocrystal Thin Films during Ligan-Excnage Processes for Potential Applications in Wearable Sensors", ACS Applied Material and Interfaces, 2019, 10, 255502-25510. (Year: 2018).*

(Continued)

*Primary Examiner* — Lisa M Caputo
*Assistant Examiner* — Nasir U. Ahmed
(74) *Attorney, Agent, or Firm* — NSIP Law

(57) ABSTRACT

Disclosed are a high-sensitivity temperature sensor and a method of manufacturing the same. A high-sensitivity temperature sensor according to an embodiment of the present disclosure includes a stretchable substrate; a first temperature-sensing layer formed on the stretchable substrate and configured to include a first temperature-sensing part in which cracks are formed by conductive nanoparticles surrounded with a second organic ligand; first and second electrodes formed to be spaced apart from each other on the first temperature-sensing layer and configured to include conductive nanoparticles surrounded with an inorganic ligand; a second temperature-sensing part formed between the first and second electrodes and cracked due to the conductive nanoparticles surrounded with the second organic ligand; a second temperature-sensing layer formed on the first and second electrodes and cracked due to the conductive nanoparticles surrounded with the second organic ligand; and a protective layer formed on the second temperature-sensing part.

10 Claims, 13 Drawing Sheets

(56) References Cited

FOREIGN PATENT DOCUMENTS

KR   10-2021-0009623 A      1/2021
WO   WO-2010092984 A1 *    8/2010  ............... G01K 7/16

OTHER PUBLICATIONS

Hyungmok Joh, et al. "Engineering the Charge Transport of Ag Nanocrystals for Highly Accurate, Wearable Temperature Sensors through All-Solution Processes", Advanced Science News, 2017, 13, 1700247. (Year: 2017).*

Bang, Junsung, et al., "Highly Sensitive Temperature Sensor: Ligand-Treated Ag Nanocrystal Thin Films on PDMS with Thermal Expansion Strategy," *Advanced Functional Materials*, vol. 29, Issue 32, Aug. 8, 2019 (pp. 1-8).

Korean Office Action dated Mar. 30, 2021 in counterpart Korean Patent Application No. 10-2019-0130796 (5 pages in Korean).

Korean Notice of Allowance dated Jun. 8, 2021 in counterpart Korean Patent Application No. 10-2019-0130796 (2 pages in Korean).

* cited by examiner

[FIG. 1A]
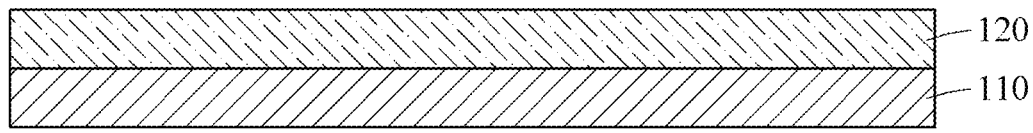
[FIG. 1B]
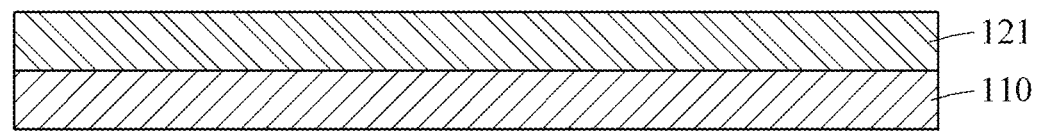
[FIG. 1C]
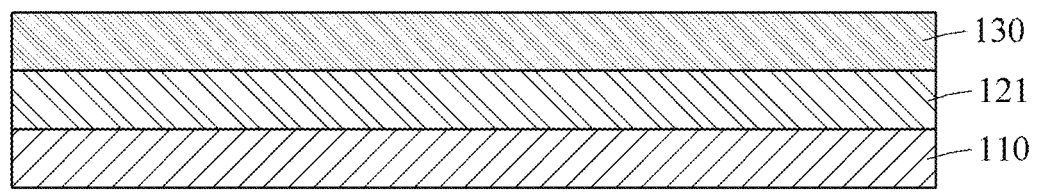
[FIG. 1D]
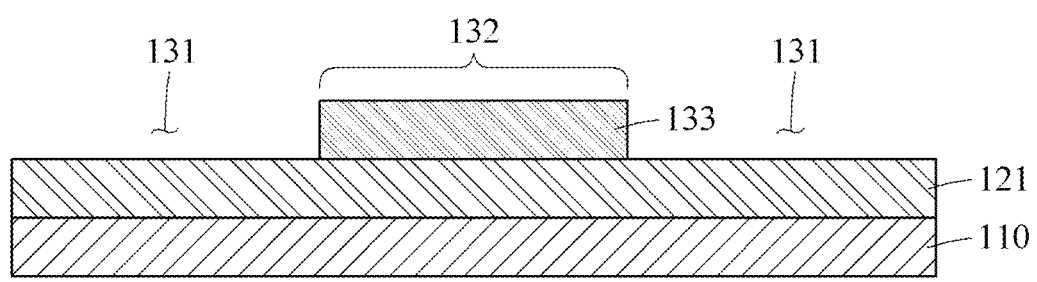

[FIG. 1E]
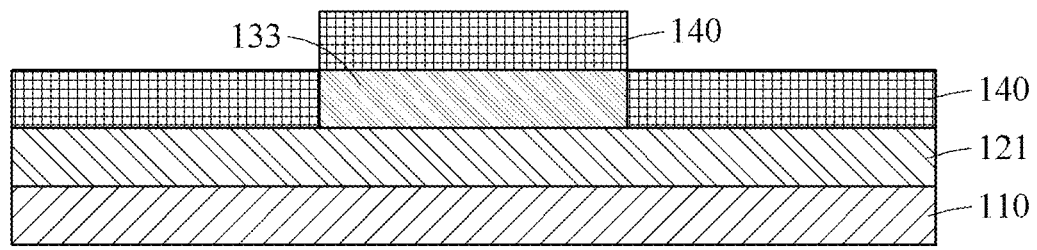
[FIG. 1F]
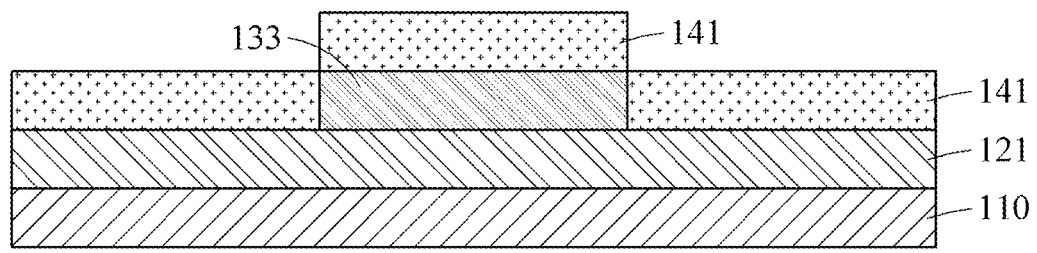
[FIG. 1G]
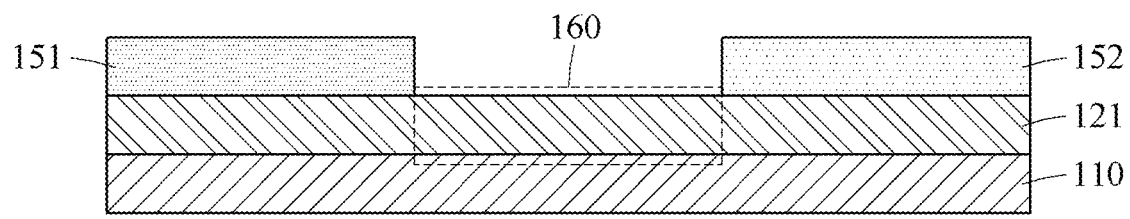
[FIG. 1H]
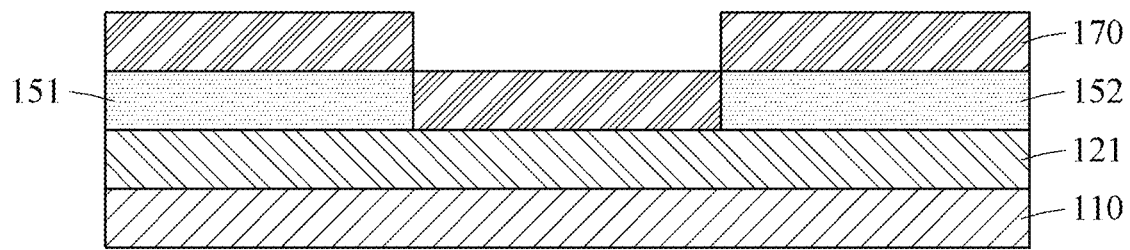

[FIG. 1I]
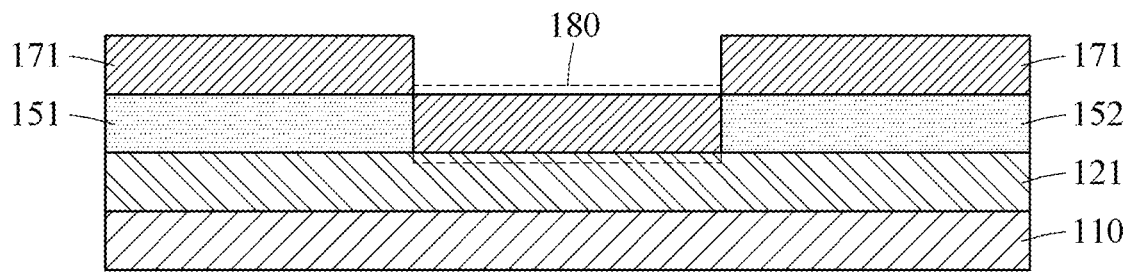
[FIG. 1J]
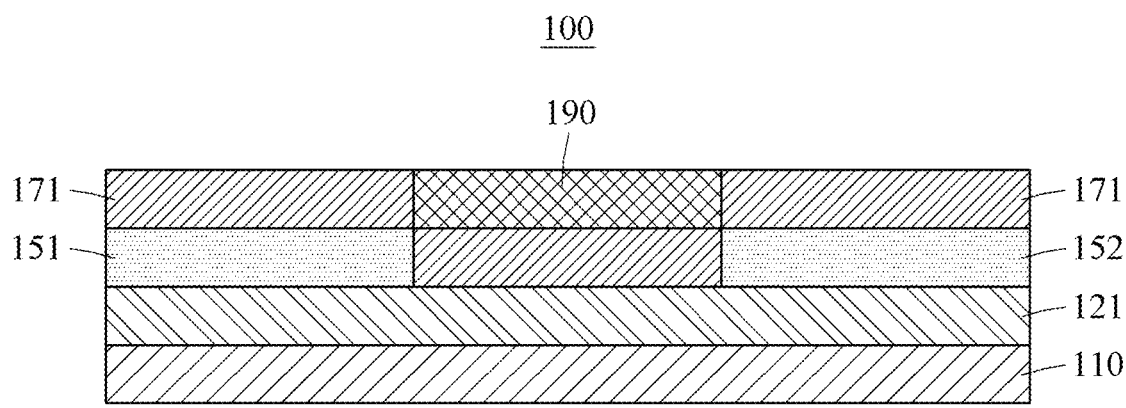
[FIG. 2]
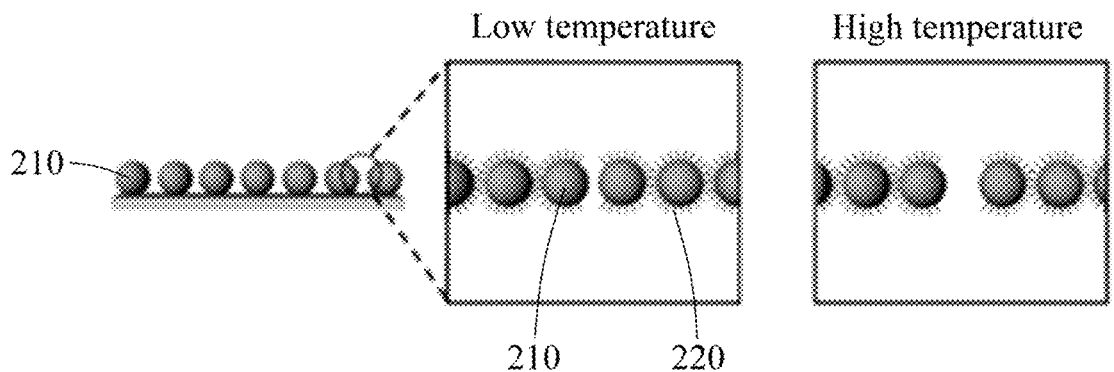

[FIG. 3]
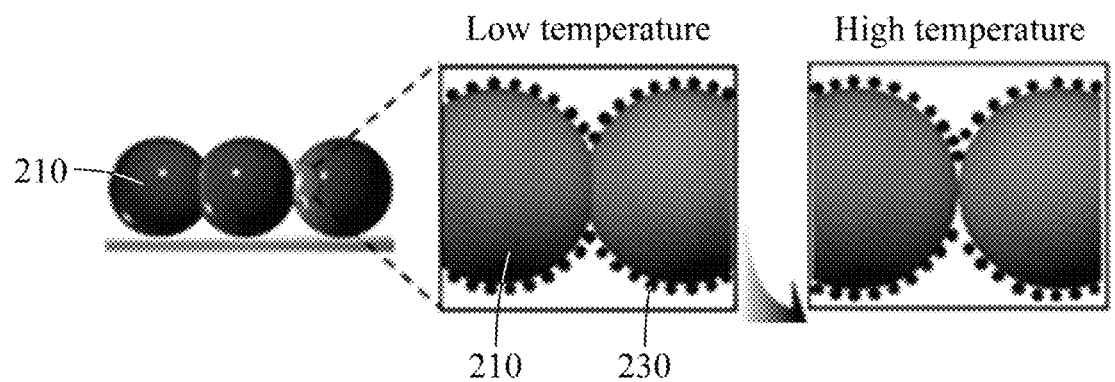
[FIG. 4]
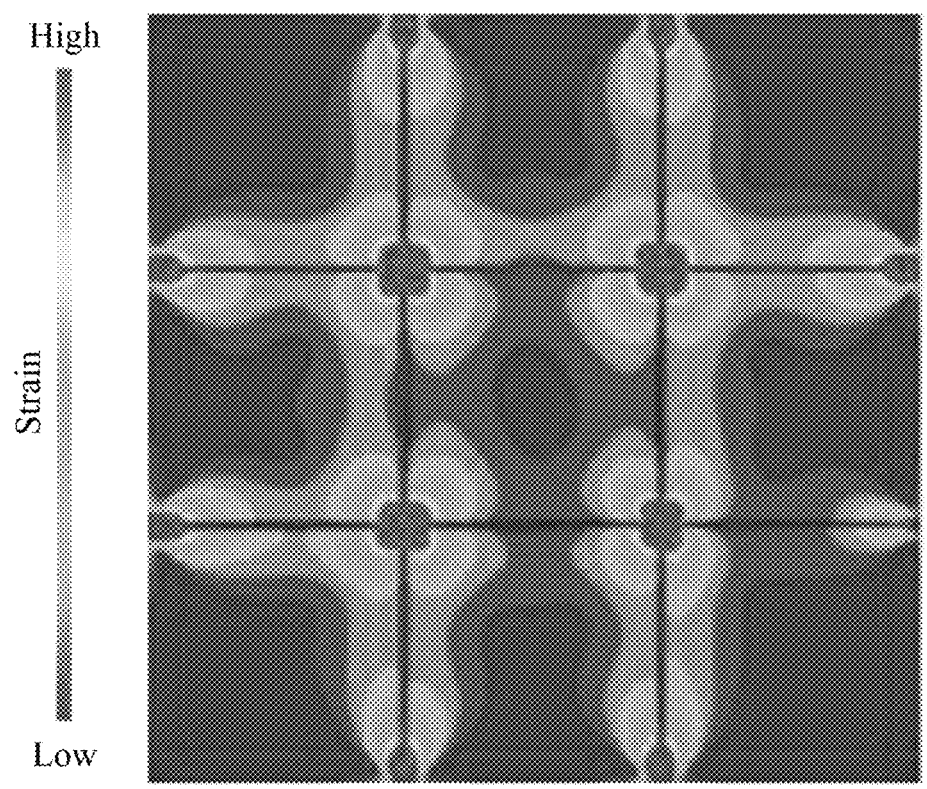

[FIG. 5]
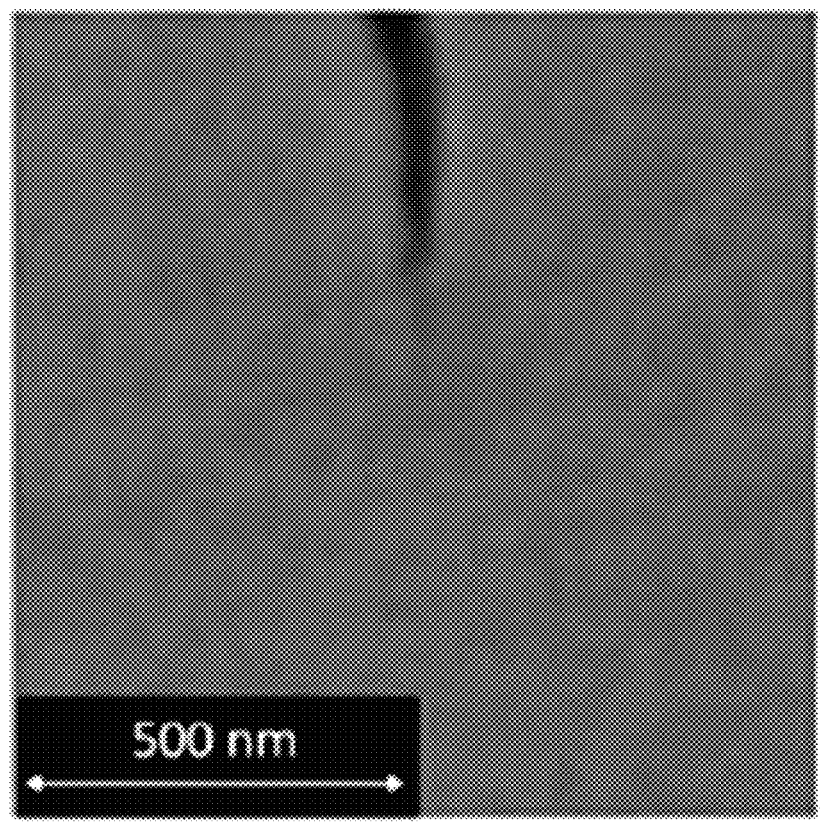

[FIG. 6]
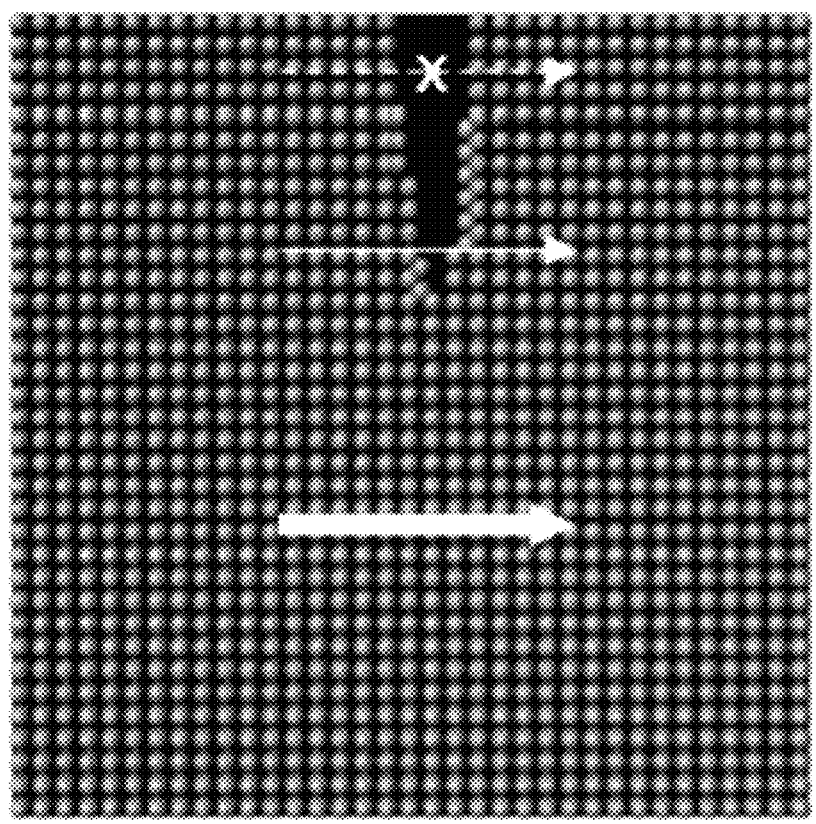

[FIG. 7]
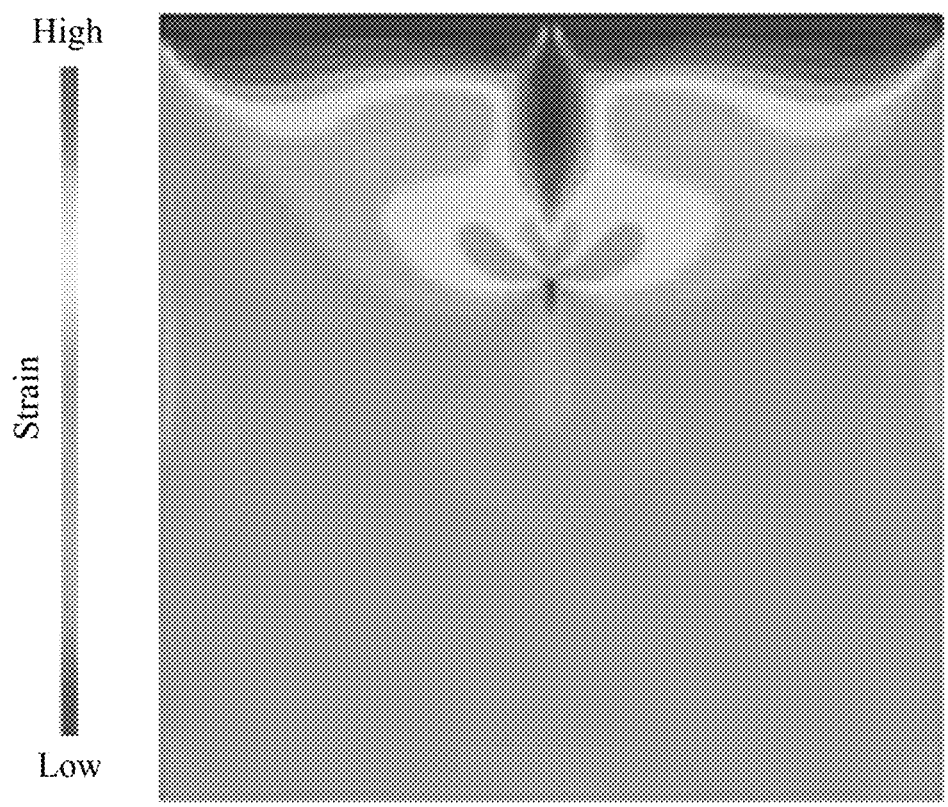

[FIG. 8]
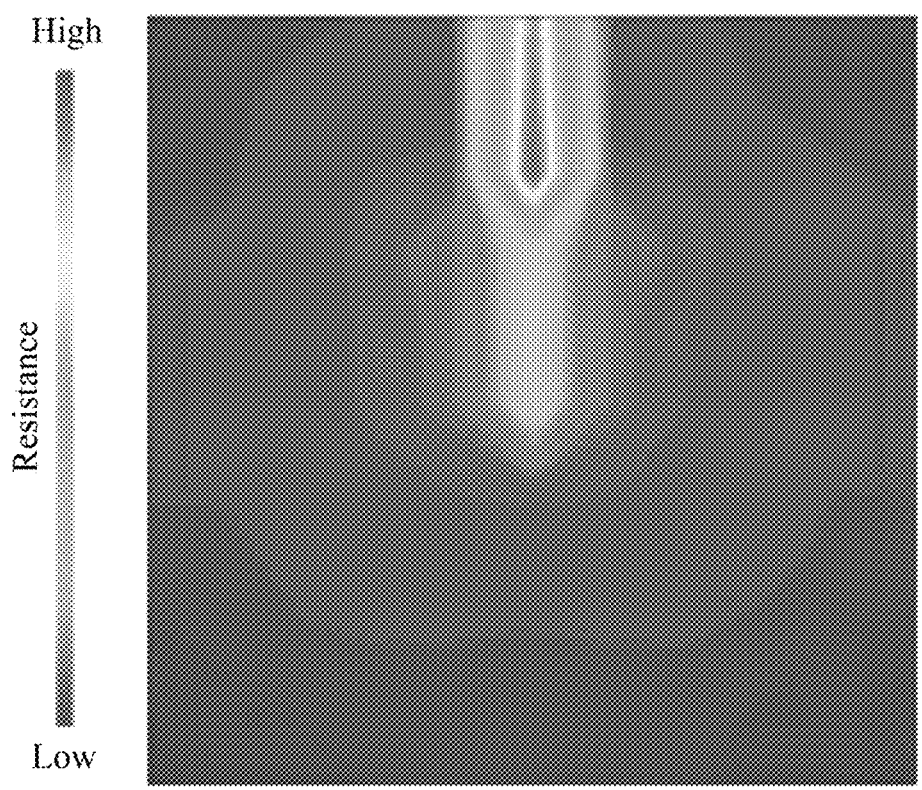

[FIG. 9]
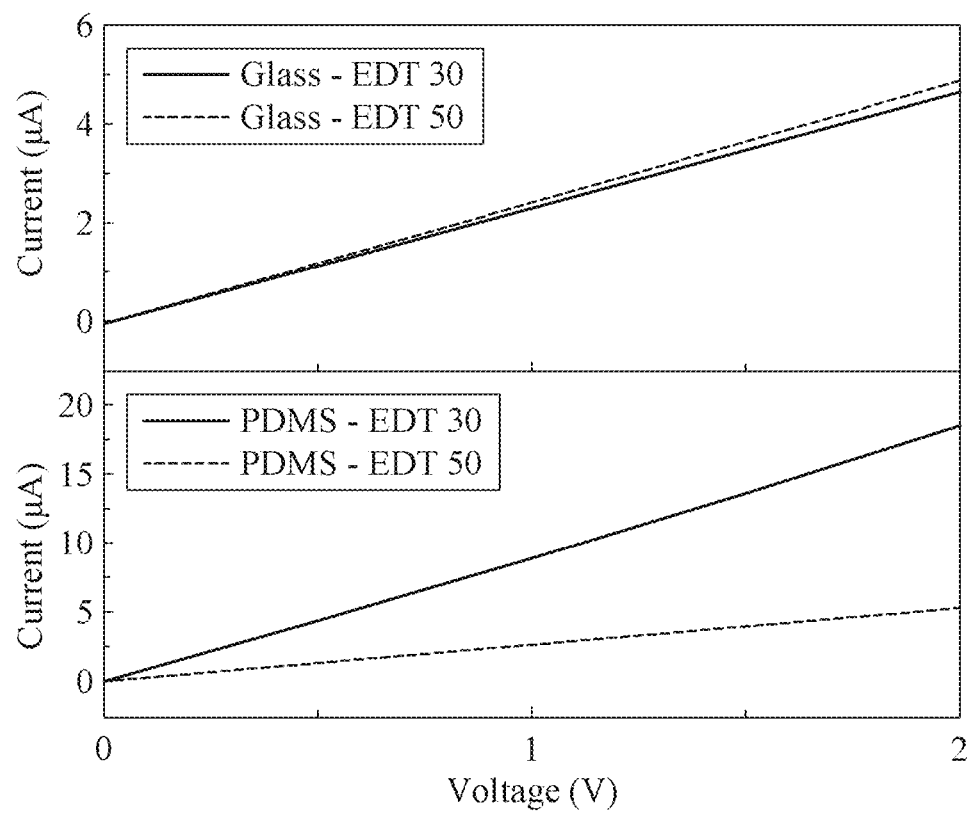

[FIG. 10]
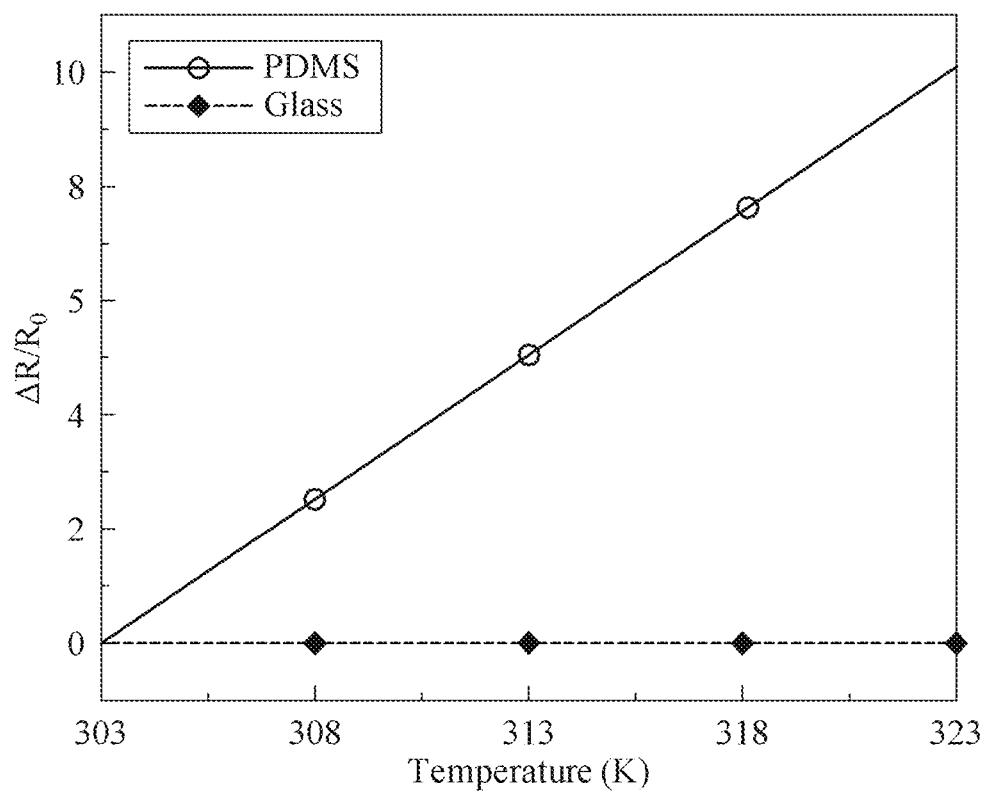

[FIG. 11]
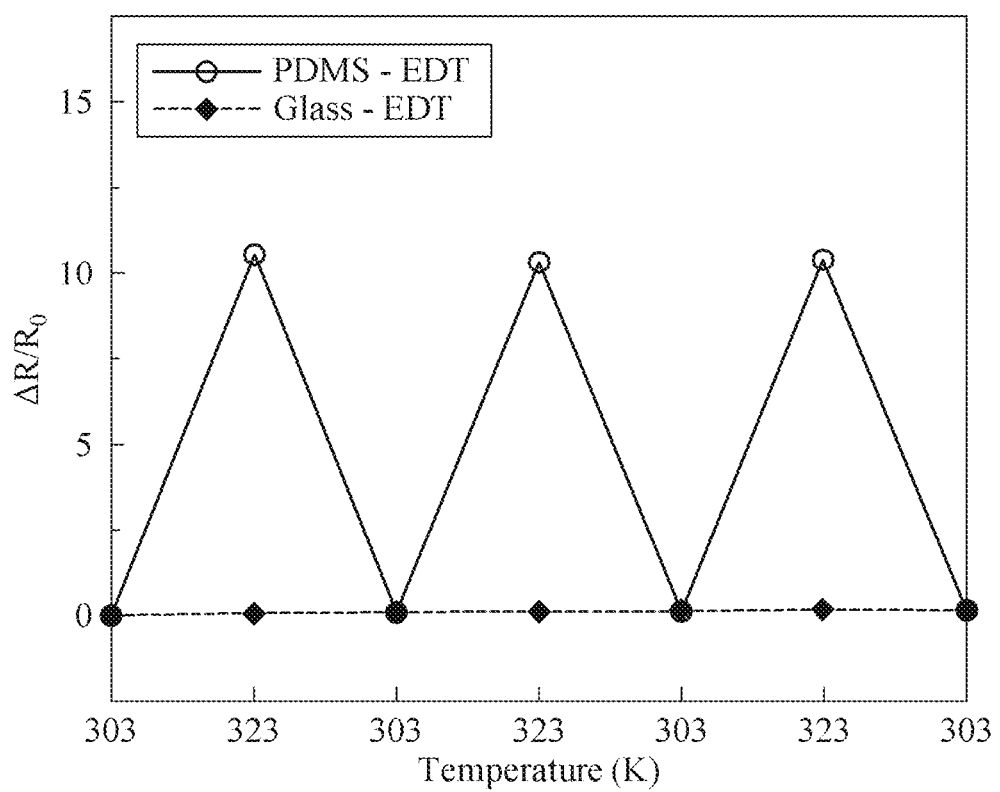

[FIG. 12]
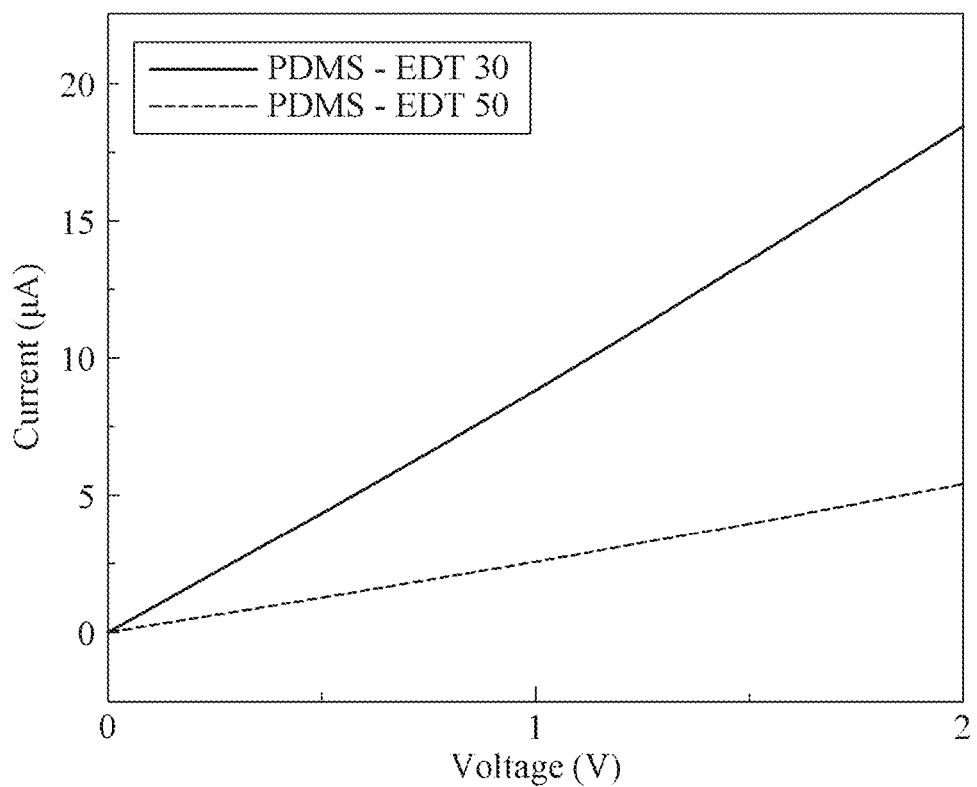

[FIG. 13]
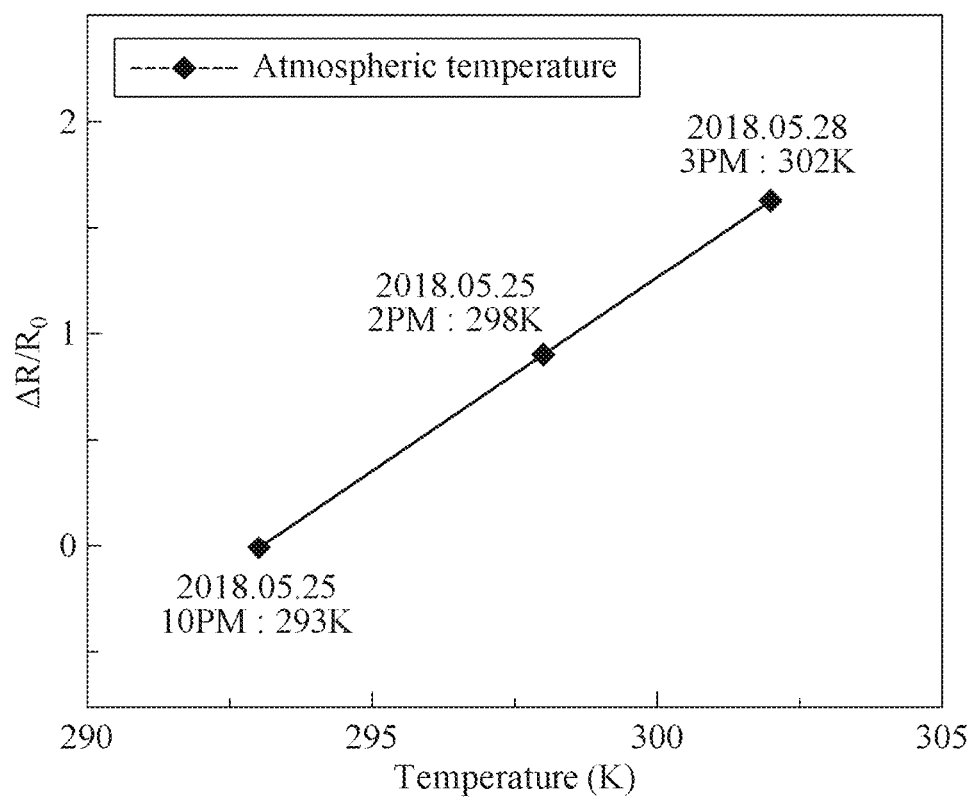

HIGH-SENSITIVITY TEMPERATURE SENSOR AND METHOD OF MANUFACTURING THE SAME

CROSS-REFERENCE TO RELATED APPLICATION

This application claims priority to Korean Patent Application No. 10-2019-0130796, filed on Oct. 21, 2019 in the Korean Intellectual Property Office, the disclosure of which is incorporated herein by reference.

BACKGROUND OF THE DISCLOSURE

Field of the Disclosure

The present disclosure relates to a high-sensitivity temperature sensor and a method of manufacturing the same.

Description of the Related Art

Temperature sensors serve to provide important information in a variety of fields such as health care monitoring, consumer electronics, manufacturing industry and environmental inspection. In such many application fields, accurate temperature measurements are required. As interest in flexible electronic devices increases, the importance of flexible material-based sensors that can be applied to wearable and attachable devices is also increasing.

Various types of sensors have been developed along with investigations related to new materials and manufacturing processes to realize various types of highly sensitive and stable temperature sensors. Specifically, sensors with various sensing mechanisms such as resistive temperature sensors, capacitive temperature sensors, transistor-based and PN junction-based temperature sensors have been widely studied.

Thereamong, a resistive temperature sensor has attracted attention in that it has a simple shape and is compatible with various materials, substrates and manufacturing processes (e.g., solution-treated materials, flexible substrates and eco-friendly), and it easily and directly measures temperature with high sensitivity through each manufacturing process and simple mechanism.

The sensitivity of a resistive temperature sensor is related to the temperature coefficient of resistance (TCR), which is defined as the ratio of resistance change to temperature change.

As the temperature changes, the resistance of a material changes due to various charge transport and scattering mechanisms or changes in shape. In particular, the charge transport mechanism significantly affects the sensitivity of a sensor.

Various methods have been studied to improve the sensitivity of resistive temperature sensors. For example, there are technologies such as a technology using volumetric thermal expansion of bipolymer substrates to improve TCR using nickel microparticles with polyethylene/polyethylene oxide or graphene nanowalls with PDMS.

These existing studies show that, when a polymer expands due to temperature changes, an active material may be mechanically deformed so that a charge transport behavior may be changed.

However, to date, there are few reports on the transport mechanism of nanoparticles in stretchable or thermally stretchable PDMS. Due to the lack of information on the chemical interface between nanoparticles and PDMS, and the lack of development protocols for making a nanoparticle thin film that can be patterned on a flexible PDMS, there are difficulties in research and development related thereto.

RELATED ART DOCUMENTS

Patent Documents

Korean Patent Application Publication No. 10-2019-001062, "FLEXIBLE ELECTRICAL ELEMENT AND SENSOR FOR MEASURING PRESSURE AND TEMPERATURE INCLUDING THE SAME"
U.S. Pat. No. 10,054,496, "TEMPERATURE DETECTION DEVICE AND TEMPERATURE SENSOR INCLUDING THE SAME"

SUMMARY OF THE DISCLOSURE

Therefore, the present disclosure has been made in view of the above problems, and it is an object of the present disclosure to provide a high-sensitivity temperature sensor including a stretchable substrate stretched by heat; and a method of manufacturing the high-sensitivity temperature sensor. Due to inclusion of the stretchable substrate, the area of the stretchable substrate increases due to thermal expansion with increasing external temperature, gaps between cracks included in temperature-sensing parts are further opened, and the resistance of the high-sensitivity temperature sensor increases. External temperature changes can be sensitively sensed through resistance changes in the high-sensitivity temperature sensor.

It is another object of the present disclosure to provide a high-sensitivity temperature sensor including a photoresist; and a method of manufacturing the high-sensitivity temperature sensor. The photoresist can be applied to a nanoparticle layer due to chemical bonding formed between a ligand-substituted organic ligand and a photoresist, so that patterning can be performed through photolithography.

It is yet another object of the present disclosure to provide a high-sensitivity temperature sensor including a stretchable substrate that thermally expands with increasing external temperature; and a method of manufacturing the high-sensitivity temperature sensor. Due to inclusion of the stretchable substrate, the high-sensitivity temperature sensor has a higher TCR than those of existing temperature sensors, thereby being capable of sensitively sensing external temperature changes.

In accordance with an aspect of the present disclosure, the above and other objects can be accomplished by the provision of a method of manufacturing a high-sensitivity temperature sensor, the method including: a step of forming a first nanoparticle layer, which includes conductive nanoparticles surrounded with a first organic ligand, on a stretchable substrate; a step of substituting the first organic ligand of the first nanoparticle layer with a second organic ligand to form a first temperature-sensing layer including cracks; a step of applying and etching a photoresist on the first temperature-sensing layer to form a region where the first temperature-sensing layer is exposed and a region where the photoresist remains; a step of forming a second nanoparticle layer, which includes the conductive nanoparticles surrounded with the first organic ligand, on the first temperature-sensing layer; a step of substituting the first organic ligand of the second nanoparticle layer with an inorganic ligand to form an electrode layer; a step of removing the region, where the photoresist remains, on the first temperature-sensing layer to form an electrode and a first temperature-sensing part; a step of forming a third nanoparticle layer, which includes conductive nanoparticles surrounded with the first organic ligand, on the electrode and the first temperature-sensing part; a step of substituting the first organic ligand of the third nanoparticle layer with the second organic ligand to form a second temperature-sensing layer, which includes cracks, and a second temperature-sensing part; and a step of forming a protective layer on the second temperature-sensing part.

In accordance with the method of manufacturing a high-sensitivity temperature sensor according to an embodiment of the present disclosure, the photoresist may be applied to the first temperature-sensing layer by forming a chemical bond with the second organic ligand.

In accordance with the method of manufacturing a high-sensitivity temperature sensor according to an embodiment of the present disclosure, the stretchable substrate may thermally expand with increasing external temperature, and the first and second temperature-sensing parts may sense resistance increase in the high-sensitivity temperature sensor due to increase in gaps between the cracks.

In accordance with the method of manufacturing a high-sensitivity temperature sensor according to an embodiment of the present disclosure, the stretchable substrate may include polydimethylsiloxane (PDMS).

In accordance with the method of manufacturing a high-sensitivity temperature sensor according to an embodiment of the present disclosure, the stretchable substrate may be treated with UV-ozone and (3-aminopropyl)triethoxysilane (APTES).

In accordance with the method of manufacturing a high-sensitivity temperature sensor according to an embodiment of the present disclosure, the stretchable substrate may have a coefficient of thermal expansion of $1.0 \times 10^{-4} K^{-1}$ to $1.0 \times 10^{-3} K^{-1}$.

In accordance with the method of manufacturing a high-sensitivity temperature sensor according to an embodiment of the present disclosure, the conductive nanoparticles may include at least one of gold (Au), silver (Ag), copper (Cu), aluminum (Al), platinum (Pt), nickel (Ni), tungsten (W), and iron (Fe).

In accordance with the method of manufacturing a high-sensitivity temperature sensor according to an embodiment of the present disclosure, the first organic ligand may include at least one of trioctylphosphineoxide (TOPO), octadecanol, oleic acid and oleylamine.

In accordance with the method of manufacturing a high-sensitivity temperature sensor according to an embodiment of the present disclosure, the second organic ligand may include at least one of 3-mercaptopropionic acid (MPA), 1,2-ethanedithiol (EDT), ethylenediamine (EDA), benzenedithiol (BDT), pyridine, methanethiosulfonyl-galactoside (TGA) and propanedithiol (PDT).

In accordance with the method of manufacturing a high-sensitivity temperature sensor according to an embodiment of the present disclosure, the inorganic ligand may include at least one of sulfur ions (S2−), chlorine ions (Cl−), bromine ions (Br−), thiocyanate ions (SCN−), iodine ions (I−), disulfide ions (HS−), tellurium ions (Te2−), hydroxide ions (OH−), boron tetrafluoride ions (BF4−) and hexafluorophosphate ions (PF6−).

In accordance with another aspect of the present disclosure, there is provided a high-sensitivity temperature sensor, including: a stretchable substrate; a first temperature-sensing layer formed on the stretchable substrate and configured to include a first temperature-sensing part in which cracks are formed by conductive nanoparticles surrounded with a second organic ligand; first and second electrodes formed to be spaced apart from each other on the first temperature-sensing layer and configured to include conductive nanoparticles surrounded with an inorganic ligand; a second temperature-sensing part formed between the first and second electrodes and cracked due to the conductive nanoparticles surrounded with the second organic ligand; a second temperature-sensing layer formed on the first and second electrodes and cracked due to the conductive nanoparticles surrounded with the second organic ligand; and a protective layer formed on the second temperature-sensing part.

In accordance with the high-sensitivity temperature sensor according to an embodiment of the present disclosure, the stretchable substrate may thermally expand with increasing external temperature, and the first and second temperature-sensing parts may sense resistance increase in the high-sensitivity temperature sensor due to increase in gaps between the cracks.

In accordance with the high-sensitivity temperature sensor according to an embodiment of the present disclosure, the stretchable substrate may include polydimethylsiloxane (PDMS).

In accordance with the high-sensitivity temperature sensor according to an embodiment of the present disclosure, the stretchable substrate may have a coefficient of thermal expansion of $1.0 \times 10^{-4} K^{-1}$ to $1.0 \times 10^{-3} K^{-1}$.

In accordance with the high-sensitivity temperature sensor according to an embodiment of the present disclosure, the first and second temperature-sensing parts may have a temperature coefficient of resistance (TCR) of 0.05K-1 to 0.6K-1.

BRIEF DESCRIPTION OF THE DRAWINGS

The above and other objects, features and other advantages of the present disclosure will be more clearly understood from the following detailed description taken in conjunction with the accompanying drawings, in which:

FIGS. 1A to 1J particularly illustrate each process of manufacturing a high-sensitivity temperature sensor according to an embodiment of the present disclosure;

FIG. 2 schematically illustrates a distance between conductive nanoparticles dependent upon temperature when a first organic ligand is substituted with a second organic ligand according to an embodiment of the present disclosure;

FIG. 3 schematically illustrates a distance between conductive nanoparticles dependent upon temperature when a first organic ligand is substituted with an inorganic ligand according to an embodiment of the present disclosure;

FIG. 4 illustrates an image of a finite element method (FEM) simulation of a nanoparticle thin film according to an embodiment of the present disclosure which is substituted with 1,2-ethanedithiol (EDT) and, accordingly, includes cracks;

FIG. 5 illustrates a Scanning Electron Microscope (SEM) image of a cross section of a nanoparticle thin film according to an embodiment of the present disclosure;

FIG. 6 illustrates a charge transfer path of a nanoparticle thin film according to an embodiment of the present disclosure;

FIG. 7 illustrates an FEM simulation of the nanoparticle thin film of FIG. 5;

FIG. 8 illustrates an FEM simulation image for a relative resistivity of the nanoparticle thin film of FIG. 5;

FIG. 9 illustrates current versus voltage of nanoparticle thin films according to a comparative example and an example of the present disclosure;

FIG. 10 illustrates resistance change versus temperature of nanoparticle thin films according to a comparative example and an example of the present disclosure;

FIG. 11 illustrates resistance change versus repeated temperature change of nanoparticle thin films according to a comparative example and an example of the present disclosure;

FIG. 12 illustrates current versus voltage of a high-sensitivity temperature sensor according to an embodiment of the present disclosure; and FIG. 13 illustrates atmospheric temperatures measured using a high-sensitivity temperature sensor according to an embodiment of the present disclosure.

DETAILED DESCRIPTION OF THE DISCLOSURE

The present disclosure will now be described more fully with reference to the accompanying drawings and contents disclosed in the drawings. However, the present disclosure should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context.

It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

In addition, as used in the description of the disclosure and the appended claims, the singular forms "a", "an" and "the" are intended to include the plural forms as well, unless context clearly indicates otherwise.

Although terms used in the specification are selected from terms generally used in related technical fields, other terms may be used according to technical development and/or due to change, practices, priorities of technicians, etc.

Therefore, it should not be understood that terms used below limit the technical spirit of the present disclosure, and it should be understood that the terms are exemplified to describe embodiments of the present disclosure. Also, some of the terms used herein may be arbitrarily chosen by the present applicant. In this case, these terms are defined in detail below.

Accordingly, the specific terms used herein should be understood based on the unique meanings thereof and the whole context of the present disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Meanwhile, in the following description of the present disclosure, a detailed description of known functions and configurations incorporated herein will be omitted when it may make the subject matter of the present disclosure unclear. The terminology used in the specification is defined in consideration of functions used in the present disclosure, and can be changed according to the intent or conventionally used methods of clients, operators, and users. Accordingly, definitions of the terms should be understood on the basis of the entire description of the present specification.

A high-sensitivity temperature sensor according to the present disclosure and the method of manufacturing the same include a stretchable substrate stretched by heat, wherein the stretchable substrate is coated with conductive nanoparticles that are surrounded with an organic or inorganic ligand with a short chain length. A distance between the conductive nanoparticles that are surrounded with an organic ligand with a short chain length increases while the stretchable substrate expands with increasing external temperature, thereby providing a high-sensitivity temperature sensor.

The high-sensitivity temperature sensor according to the present disclosure can very sensitively sense temperature change as gaps between cracks further increase while a stretchable substrate expands due to external temperature, using cracks formed by the organic ligand with a short chain length.

A method of manufacturing the high-sensitivity temperature sensor according to an embodiment of the present disclosure includes a step (S110) of forming a first nanoparticle layer, which includes conductive nanoparticles surrounded with a first organic ligand, on a stretchable substrate, a step (S120) of substituting the first organic ligand of the first nanoparticle layer with a second organic ligand to form a first temperature-sensing layer including cracks, a step (S130) of applying and etching a photoresist on the first temperature-sensing layer to form a region where the first temperature-sensing layer is exposed and a region where the photoresist remains, a step (S140) of forming a second nanoparticle layer, which includes the conductive nanoparticles surrounded with the first organic ligand, on the first temperature-sensing layer, a step (S150) of substituting the first organic ligand of the second nanoparticle layer with an inorganic ligand to form an electrode layer, a step (S160) of removing the region, where the photoresist remains, on the first temperature-sensing layer to form an electrode and a first temperature-sensing part, a step (S170) of forming a third nanoparticle layer, which includes conductive nanoparticles surrounded with the first organic ligand, on the electrode and the first temperature-sensing part, a step (S180) of substituting the first organic ligand of the third nanoparticle layer with the second organic ligand to form a second temperature-sensing layer, which includes cracks, and a second temperature-sensing part, and a step (S190) of forming a protective layer on the second temperature-sensing part.

Hereinafter, the method of manufacturing a high-sensitivity temperature sensor according to an embodiment of the present disclosure and a high-sensitivity temperature sensor manufactured according to the method are described in detail width reference to FIGS. 1A to 1J.

FIGS. 1A to 1J particularly illustrate each process of manufacturing a high-sensitivity temperature sensor according to an embodiment of the present disclosure.

First, referring to FIG. 1A, a stretchable substrate 110 is coated with a solution including conductive nanoparticles that are surrounded with a first organic ligand to form a first nanoparticle layer 120 in S110.

The conductive nanoparticles may be nanoscopic spherical particles including a conductive material.

For example, the conductive nanoparticles may be spherical particles including at least one of gold (Au), silver (Ag), copper (Cu), aluminum (Al), platinum (Pt), nickel (Ni), tungsten (W), and iron (Fe), and may be formed of any material having conductivity.

The first organic ligand may have a longer chain length than that of the second organic ligand, and may have 8 to 18 carbon chains according to embodiments.

For example, the first organic ligand may include at least one of trioctylphosphineoxide (TOPO), octadecanol, oleic acid and oleylamine.

The conductive nanoparticles surrounded with the first organic ligand may be synthesized by mixing a precursor of a conductive material included in the conductive nanoparticles with the first organic ligand, followed by processes such as degassing, heating, and cooling.

In accordance with an embodiment, silver nanoparticles surrounded with oleylamine and oleic acid may be synthesized through processes, such as degassing, heating, and cooling, after mixing silver nitrate ($AgNO_3$), oleylamine, and oleic acid, but the present disclosure is not limited thereto.

The solution including the conductive nanoparticles surrounded with the first organic ligand may include a solvent for dispersing the conductive nanoparticles surrounded with the first organic ligand.

The solvent for dispersing the conductive nanoparticles surrounded with the first organic ligand may be at least one of octane, hexane, and toluene according to embodiments, and may be any non-polar solvent without being limited to the materials.

In accordance with an embodiment, the solution including the conductive nanoparticles surrounded with the first organic ligand may be coated on the stretchable substrate 110 by any one of spin coating, spray coating, ultra-spray coating, electrospinning coating, slot die coating, gravure coating, bar coating, roll coating, dip coating, shear coating, screen printing, inkjet printing and nozzle printing.

In accordance with an embodiment, the solution including the conductive nanoparticles surrounded with the first ligand is coated on the stretchable substrate 110, and then a drying process is additionally performed to form the first nanoparticle layer 120, in S110.

Alternatively, in accordance with an embodiment, the conductive nanoparticles surrounded with the first organic ligand may be deposited on the stretchable substrate 110 by any one of sputtering, Atomic Layer Deposition (ALD), Chemical Vapor Deposition (CVD), thermal evaporation, co-evaporation, Plasma-Enhanced Chemical Vapor Deposition (PECVD), e-beam evaporation, Radio Frequency (RF) sputtering, magnetron sputtering, vacuum deposition and chemical vapor deposition to form the first nanoparticle layer 120.

The stretchable substrate 110, which is stretched by heat, is flexible and stretchable by heat unlike a flexible substrate that can be bent, so that the area of the expansion substrate 110 increases with increasing external temperature.

The stretchable substrate 110 expands with increasing external temperature, so that gaps between cracks of the first and second temperature-sensing parts formed on the stretchable substrate 110 increase, resulting in resistance increase of the high-sensitivity temperature sensor. Accordingly, external temperature changes may be sensitively sensed through a resistance change amount in the high-sensitivity temperature sensor. The principle of a high-sensitivity temperature sensor including the stretchable substrate 110 is described in detail when a high-sensitivity temperature sensor is described below.

The stretchable substrate 110 includes a material having a large coefficient of thermal expansion, thereby having high sensitivity to external temperature changes and, accordingly, may sensitively sense temperature changes due to thermal expansion according to external temperature increase.

In accordance with an embodiment, the stretchable substrate 110 may include a material having a coefficient of thermal expansion of $1.0 \times 10^{-4} K^{-1}$ to $1.0 \times 10^{-3} K^{-1}$.

When the thermal expansion coefficient is less than $1.0 \times 10^{-4} K^{-1}$, the stretchable substrate may not expand sufficiently to sensitively sense external temperature.

For example, polyethylene terephthalate (PET) having a coefficient of thermal expansion of about $1.0 \times 10^{-6} K^{-1}$ does not sufficiently expand by heat, and thus, does not sensitively sense external temperature, whereas polyurethane (PU) having a coefficient of thermal expansion of about $1.0 \times 10^{-4} K^{-1}$ easily expands by external temperature, thus being capable of sensitively sensing external temperature.

Accordingly, the stretchable substrate 110 may include, particularly, at least one of polydimethylsiloxane (PDMS), Ecoflex and hydrogel, and a material of the stretchable substrate 110 is not specifically limited so long as it is a polymer having a coefficient of thermal expansion of $1.0 \times 10^{-4} K^{-1}$ or more.

PDMS has a relatively large thermal expansion coefficient of $3.2 \times 10^{-4} K^{-1}$, thus being preferred as a material included in the stretchable substrate 110.

In accordance with an embodiment, before S110, the stretchable substrate 110 may be treated with UV-ozone and (3-aminopropyl)triethoxysilane (APTES) to form a self-assembled monolayer.

UV-ozone treatment is a process for removing impurities on a surface of the stretchable substrate 110 and improving bonding strength with APTES. By UV-ozone treatment, a hydroxyl group (—OH) is formed on a surface of the stretchable substrate 110 to bind to an APTES molecule.

APTES treatment is a process of forming an amine group (—NH2) on the stretchable substrate 110 treated with UV-ozone to finally form a self-assembled monolayer. By the APTES treatment, conductive nanoparticles of the first nanoparticle layer 120 formed on the stretchable substrate 110 may be chemically bonded to the amine group.

Accordingly, adhesive strength between the conductive nanoparticles of the first nanoparticle layer 120 and the stretchable substrate 110 may be improved.

By the UV-ozone treatment and the APTES treatment, particularly, a surface of the stretchable substrate 110 is treated with UV-ozone, and then spin-coated with an APTES solution, thereby forming a self-assembled monolayer on the surface of the stretchable substrate 110. In addition, the amine group of APTES included in the self-assembled monolayer may increase adhesion between the stretchable substrate 110 and the first nanoparticle layer 120.

Referring to FIG. 1B, in S120, the stretchable substrate 110 on which the first nanoparticle layer has been formed is contained in the second organic ligand solution to substitute the first organic ligand with a second organic ligand.

The second organic ligand solution is a solution including the second organic ligand. The second organic ligand has a shorter chain length than the first organic ligand and may be an organic ligand including 1 to 3 carbon chains according to embodiments.

For example, the second organic ligand may include at least one of 3-mercaptopropionic acid (MPA), 1,2-ethanedithiol (EDT) and ethylenediamine (EDA), but the present disclosure is not limited to the materials.

By S120, the first organic ligand with a short chain length which surrounds the conductive nanoparticles of the first nanoparticle layer is substituted with the second organic ligand with a short chain length, so that cracks may be formed in correspondence with a space formed by the shortened chain length.

Accordingly, in S120, a first temperature-sensing layer 121 including cracks may be formed through the process of substituting the first organic ligand with the second organic ligand. The first temperature-sensing layer 121 may include conductive nanoparticles surrounded with the second organic ligand.

Referring to FIG. 1C, in S130, a photoresist 130 is applied to the first temperature-sensing layer 121.

PDMS, which is one of materials generally used to form the stretchable substrate 110, has very high stability. Accordingly, it is impossible to perform an additional process on a PDMS material.

That is, it is impossible to coat the photoresist 130 on the stretchable substrate 110 due to high stability of PDMS, and thus, it is also impossible to perform photolithography.

However, the method of manufacturing the high-sensitivity temperature sensor according to an embodiment of the present disclosure includes forming the first temperature-sensing layer 121, which includes conductive nanoparticles surrounded with the second organic ligand, on the stretchable substrate 110, so that chemical bonding between the second organic ligand and the photoresist 130 may be realized.

Accordingly, by S130, the photoresist 130 is applied to the first temperature-sensing layer 121 including the second organic ligand unlike conventional cases, so that photolithography may be performed.

In accordance with an embodiment, the photoresist 130 may be applied to the first temperature-sensing layer 121 by any one of spin coating, spray coating, ultra-spray coating, electrospinning coating, slot die coating, gravure coating, bar coating, roll coating, dip coating, shear coating, screen printing, inkjet printing and nozzle printing.

Referring to FIG. 1D, in S130, a photoresist is applied to the first temperature-sensing layer 121, and then the photoresist is etched through photolithography, thereby forming a region 131 where the first temperature-sensing layer is exposed and a region 132 where the photoresist remains.

Particularly, in S130, a portion of the photoresist may be etched through a pattern mask, so that a portion of the first temperature-sensing layer 121 is exposed through the etched region.

Photolithography is a technique well known to those skilled in the art and, as such, a detailed description thereof is omitted.

In S130, a photoresist is applied to the first nanoparticle layer, and a portion of the photoresist is etched, so that the region 131 where the first temperature-sensing layer is exposed and the region 132 where the photoresist remains are formed, resulting in step formation.

Referring to FIG. 1, in S140, the solution including conductive nanoparticles surrounded with the first organic ligand is applied to the exposed first temperature-sensing layer 121 and the remaining photoresist 133 that are formed by S130, thereby forming a second nanoparticle layer 140.

The first organic ligand and the conductive nanoparticles constituting the second nanoparticle layer 140 have been described above with reference to FIG. 1A, so description thereof is omitted.

In accordance with an embodiment, the solution including the conductive nanoparticles surrounded with the first organic ligand may be applied to the exposed first temperature-sensing layer 121 and the remaining photoresist 133 using any one of spin coating, spray coating, ultra-spray coating, electrospinning coating, slot die coating, gravure coating, bar coating, roll coating, dip coating, shear coating, screen printing, inkjet printing and nozzle printing.

In accordance with an embodiment, in S140, a drying process may be additionally performed after applying the solution including the conductive nanoparticles surrounded with the first ligand on the exposed first temperature-sensing layer 121 and the remaining photoresist 133, thereby forming the second nanoparticle layer 140.

Alternatively, in accordance with an embodiment, the conductive nanoparticles surrounded with the first organic ligand may be deposited on the exposed first temperature-sensing layer 121 and the remaining photoresist 133 using any one of sputtering, Atomic Layer Deposition (ALD), Chemical Vapor Deposition (CVD), thermal evaporation, co-evaporation, Plasma-Enhanced Chemical Vapor Deposition (PECVD), e-beam evaporation, Radio Frequency (RF) sputtering, magnetron sputtering, vacuum deposition and chemical vapor deposition, thereby forming the second nanoparticle layer 140.

In S140, the second nanoparticle layer 140 may also be formed to have a step structure due to the step structure that is caused by the exposed first temperature-sensing layer 121 and the remaining photoresist 133 formed in S130.

Referring to FIG. 1F, in S150, the stretchable substrate 110 on which the second nanoparticle layer has been formed is contained in an inorganic ligand solution to substitute the first organic ligand included in the second nanoparticle layer with an inorganic ligand.

The inorganic ligand solution includes an inorganic ligand. The inorganic ligand may have a very short chain length compared to the first and second organic ligands.

In accordance with an embodiment, the inorganic ligand may include at least one of sulfur ions ($S^{2-}$), chlorine ions ($Cl^-$), bromine ions ($Br^-$), thiocyanate ions ($SCN^-$), iodine ions ($I^-$), disulfide ions ($HS^-$), tellurium ions ($Te^{2-}$), hydroxide ions ($OH^-$), boron tetrafluoride ions ($BF_4^-$) and hexafluorophosphate ions ($PF_6^-$), but the present disclosure is not limited to the materials.

In accordance with an embodiment, the inorganic ligand may be bromine ions ($Br^-$). Accordingly, the inorganic ligand solution may be tetra-n-butylammonium bromide (TBAB) including bromine ions.

In S150, the first organic ligand with a long chain length which surrounds conductive nanoparticles of the second nanoparticle layer is substituted with the inorganic ligand, thereby forming cracks in correspondence with spaces formed due to the shorted chain length.

However, conductive nanoparticles surrounded with the inorganic ligand may contact each other because the inorganic ligand has a very short chain length, so that a smaller number of cracks may be included than in the first temperature-sensing layer 121. In addition, high conductivity is exhibited, compared to the first temperature-sensing layer 121 including the second organic ligand, due to contact between the conductive nanoparticles.

Accordingly, in S150, an electrode layer 141 may be formed to have higher conductivity than the first temperature-sensing layer 121 through a process of substituting the first organic ligand with the inorganic ligand, and the electrode layer 141 may include conductive nanoparticles surrounded with an inorganic ligand.

Further, in S150, the electrode layer 141 may be formed on the exposed first temperature-sensing layer 121 and the remaining photoresist 133 that are formed by S130.

Referring to FIG. 1G, in S160, the photoresist formed on the region of the photoresist that remains on the first temperature-sensing layer 121; and the electrode layer formed on the remaining photoresist are removed to form a first temperature-sensing part 160.

In addition, in S160, electrodes 151 and 152 may be formed to be spaced apart from each other on the first temperature-sensing layer 121 while removing the remaining photoresist and the electrode layer formed on the remaining photoresist.

The first temperature-sensing part 160 corresponds to a region other than regions including the electrodes 151 and 152 formed on the first temperature-sensing layer 121. The first temperature-sensing part 160 corresponds to the first temperature-sensing layer 121 exposed between the first electrode 151 and the second electrode 152 spaced apart from each other.

Referring to FIG. 1H, in S170, the solution including conductive nanoparticles surrounded with the first organic ligand is applied to the electrodes 151 and 152 and the first temperature-sensing part, thereby forming a third nanoparticle layer 170.

The conductive nanoparticles surrounded with the first organic ligand have been described in S110, so description thereof is omitted.

In accordance with an embodiment, the solution including the conductive nanoparticles surrounded with the first organic ligand may be applied to the electrodes 151 and 152 and the first temperature-sensing part using any one of spin coating, spray coating, ultra-spray coating, electrospinning coating, slot die coating, gravure coating, bar coating, roll coating, dip coating, shear coating, screen printing, inkjet printing and nozzle printing.

In accordance with an embodiment, in S170, a drying process may be performed after applying the solution including the conductive nanoparticles surrounded with the first ligand on the electrodes 151 and 152 and the first temperature-sensing part, thereby forming a third nanoparticle layer 170.

Alternatively, in accordance with an embodiment, the conductive nanoparticles surrounded with the first organic ligand may be deposited on the electrodes 151 and 152 and the first temperature-sensing part using any one of sputtering, Atomic Layer Deposition (ALD), Chemical Vapor Deposition (CVD), thermal evaporation, co-evaporation, Plasma-Enhanced Chemical Vapor Deposition (PECVD), e-beam evaporation, Radio Frequency (RF) sputtering, magnetron sputtering, vacuum deposition and chemical vapor deposition, thereby forming the third nanoparticle layer 170.

In S170, the third nanoparticle layer 170 may also be formed to have a step structure due to the step structure caused by the first electrode 151 and the second electrode 152 that are spaced apart from each other by S160.

Referring to FIG. 1I, in S180, the stretchable substrate 110 on which the third nanoparticle layer has been formed is contained the second organic ligand solution to substitute the first organic ligand of the third nanoparticle layer with the second organic ligand.

The second organic ligand solution and the second organic ligand have been described in S120, so description thereof is omitted.

In S180, cracks may be cracks in correspondence with spaces formed due to a shorted chain length while the first organic ligand with a long chain length which surrounds conductive nanoparticles of the third nanoparticle layer is substituted with the second organic ligand with a short chain length.

Accordingly, in S180, the second temperature-sensing layer 171 including cracks may be formed on the electrodes 151 and 152 through a process of substituting the first organic ligand with the second organic ligand, and a second temperature-sensing part 180 including cracks may be formed on the first temperature-sensing part.

Here, the second temperature-sensing layer 171 and the second temperature-sensing part 180 may include conductive nanoparticles surrounded with the second organic ligand.

In the method of manufacturing the high-sensitivity temperature sensor according to an embodiment of the present disclosure in accordance with an embodiment, at least two temperature sensing parts may be formed by repeatedly performing S170 and S180. The temperature sensing capability of the high-sensitivity temperature sensor may be improved through the at least two temperature sensing parts.

Referring to FIG. 1J, in S190, a protective layer 190 is formed on the second temperature-sensing part 180 through an encapsulation process, thereby manufacturing a high-sensitivity temperature sensor 100.

The protective layer 190 is formed on the second temperature-sensing part 180 to protect the high-sensitivity temperature sensor 100 including the first temperature-sensing part 160, the second temperature-sensing part 180 and the electrodes from physical and chemical contamination.

In accordance with an embodiment, the protective layer 190 includes the same material as the stretchable substrate 110, thereby minimizing the risk of peeling due to a coefficient of thermal expansion difference between the protective layer 190 and the stretchable substrate 110 while the stretchable substrate 110 expands with increasing external temperature.

For example, the protective layer 190 may be formed of liquid PDMS through an encapsulation process.

A high-sensitivity temperature sensor manufactured by the method according to an embodiment of the present disclosure includes a stretchable substrate stretched by heat, so that the area of the stretchable substrate increases due to thermal expansion with increasing external temperature, gaps between cracks included in the first and second temperature-sensing parts are further opened, and the resistance of the high-sensitivity temperature sensor increases. External temperature changes can be sensitively sensed through resistance changes in the high-sensitivity temperature sensor.

Here, since regions, which are in contact with the first and second electrodes, of the first temperature-sensing layer and the second temperature-sensing layer are in contact with the first and second electrodes hardly affected by thermal expansion of the stretchable substrate, the regions and the second temperature-sensing layer have relatively low temperature sensing ability, i.e., relatively low external temperature change sensing ability caused by opening of cracks due to thermal expansion of the stretchable substrate, compared to the first and second temperature-sensing parts.

Accordingly, the high-sensitivity temperature sensor manufactured according to the method according to an embodiment of the present disclosure can sensitively sense external temperature changes because resistance rapidly increases as gaps between cracks included in the first and second temperature-sensing parts increase due to thermal expansion of the stretchable substrate.

The stretchable substrate may thermally expand in all directions with increasing external temperature, and the first and second temperature-sensing parts formed on the stretchable substrate may have the same coefficient of thermal expansion as the stretchable substrate.

The high-sensitivity temperature sensor manufactured according to the method according to an embodiment of the present disclosure can very sensitively sense external temperature changes because, when the stretchable substrate thermally expands while external temperature increases, strain is concentrated on cracks included in the first and second temperature-sensing parts and, at the same time, a thermal expansion phenomenon is concentrated on the cracks.

In addition, by the method of manufacturing the high-sensitivity temperature sensor according to an embodiment of the present disclosure, the photoresist may be applied to the first nanoparticle layer due to chemical bonding between the second organic ligand of the first nanoparticle layer and the photoresist. Accordingly, patterning may be performed through photolithography unlike conventional technologies in which a photoresist cannot be applied to a PDMS substrate.

Referring to FIG. 1J again, the high-sensitivity temperature sensor 100 manufactured by the method of the present disclosure includes the stretchable substrate 110; the first temperature-sensing layer 121 formed on the stretchable substrate 110 and configured to include the first temperature-sensing part 160 in which cracks are formed by conductive nanoparticles surrounded with the second organic ligand; the first and second electrodes 151 and 152 formed to be spaced apart from each other on the first temperature-sensing layer 121 and configured to include conductive nanoparticles surrounded with the inorganic ligand; the second temperature-sensing part 180 formed between the first electrode 151 and the second electrode 152 and cracked due to the conductive nanoparticles surrounded with the second organic ligand; the second temperature-sensing layer 171 formed on the first and second electrodes 151 and 152 and cracked due to the conductive nanoparticles surrounded with the second organic ligand; and the protective layer 190 formed on the second temperature-sensing part 180.

Here, the high-sensitivity temperature sensor 100 according to an embodiment of the present disclosure includes the components used in the method of manufacturing the high-sensitivity temperature sensor 100, so description thereof is omitted.

The stretchable substrate 110 may thermally expand in all directions with increasing external temperature, and the first and second temperature-sensing parts 160 and 180 formed on the stretchable substrate 110 may have the same coefficient of thermal expansion as the stretchable substrate 110.

The high-sensitivity temperature sensor 100 according to an embodiment of the present disclosure can very sensitively sense external temperature changes because, when the stretchable substrate 110 thermally expands while external temperature increases, strain is concentrated on cracks included in the first temperature-sensing part 160 and the second temperature-sensing part 180 and, at the same time, a thermal expansion phenomenon is concentrated on the cracks.

The stretchable substrate 110 thermally expands according to increase in external temperature, and the stretchable substrate 110 may have a coefficient of thermal expansion of $1.0 \times 10^{-4} K^{-1}$ to $1.0 \times 10^{-3} K^{-1}$.

Gaps between cracks included in the first and second temperature-sensing parts 160 and 180 increase due to thermal expansion of the stretchable substrate 110 according to increase in external temperature, so that the resistance of the high-sensitivity temperature sensor 100 according to an embodiment of the present disclosure increases. External temperature changes may be sensed through resistance increase in the high-sensitivity temperature sensor 100.

In addition, the high-sensitivity temperature sensor 100 according to an embodiment of the present disclosure includes the first and second temperature-sensing parts 160 and 180, instead of a single temperature sensing part, thereby being capable of more sensitively sensing temperature changes according to increase in external temperature.

In accordance with an embodiment, the high-sensitivity temperature sensor 100 according to an embodiment of the present disclosure may include the first and second temperature-sensing parts 160 and 180 that are repeatedly formed, i.e., at least two temperature sensing parts.

FIG. 2 schematically illustrates a distance between conductive nanoparticles dependent upon temperature when a first organic ligand is substituted with a second organic ligand according to an embodiment of the present disclosure.

Referring to FIG. 2, when conductive nanoparticles 210 surrounded with a second organic ligand 220 included in a first temperature-sensing part and a second temperature-sensing part are formed on a stretchable substrate, cracks may be formed between the conductive nanoparticles 210 while the first organic ligand is substituted with the second organic ligand 220.

When external temperature increases from low temperature to high temperature, gaps between cracks included in the conductive nanoparticles 210 surrounded with the second organic ligand 220 on the stretchable substrate increase while the stretchable substrate thermally expands, so that resistance increases while a charge transfer path is blocked.

Accordingly, gaps between cracks included in the first and second temperature-sensing parts of the high-sensitivity temperature sensor according to an embodiment of the present disclosure increase and resistance increases while the stretchable substrate thermally expands with increasing external temperature. Increase in external temperature may be sensed from the resistance change.

FIG. 3 schematically illustrates a distance between conductive nanoparticles dependent upon temperature when a first organic ligand is substituted with an inorganic ligand according to an embodiment of the present disclosure.

Referring to FIG. 3, when conductive nanoparticles 210 surrounded with an inorganic ligand 230 included in first and second electrodes are formed on a stretchable substrate, a distance between the conductive nanoparticles 210 hardly changes even when the stretchable substrate thermally expands as external temperature increases from low temperature to high temperature.

The conductive nanoparticles 210 surrounded with an inorganic ligand 230 included in the first and second electrodes are hardly cracked due to the inorganic ligand 230 with a very short chain length, and the conductive nanoparticles 210 contact each other, so that a charge transfer path may be well formed and, accordingly, electrical characteristics may be exhibited.

In addition, the inorganic ligand 230 may be an anion such as a bromine ion according to embodiments. Accordingly, the conductive nanoparticles 210 surrounded with the inorganic ligand 230 exhibit stronger electrical characteristics, compared to conductive nanoparticles 210 surrounded with a second organic ligand, due to electrical characteristics of the anion.

Accordingly, the conductive nanoparticles 210 surrounded with the inorganic ligand 230 may be used as the first and second electrodes due to the electrical characteristics thereof. A charge transfer path is not well formed in the conductive nanoparticles 210 surrounded with the second organic ligand due to cracks therein, so that the conductive nanoparticles 210 surrounded with the second organic ligand may be used as the first and second temperature-sensing parts.

In summary, the high-sensitivity temperature sensor according to an embodiment of the present disclosure may sense increase in external temperature by the stretchable substrate, which expands by heat, and cracks included in the first and second temperature-sensing parts including the conductive nanoparticles surrounded with the second organic ligand.

The sensitivity of the high-sensitivity temperature sensor according to an embodiment of the present disclosure is related to a temperature coefficient of resistance (TCR).

Since the high-sensitivity temperature sensor according to an embodiment of the present disclosure may sense external temperature increase by the first and second temperature-sensing parts, the sensitivity of the high-sensitivity temperature sensor according to an embodiment of the present disclosure may be related to TCR of the first and second temperature-sensing parts.

TCR can be defined as a ratio of a resistance change amount to a temperature change amount. TCR increases with increasing resistance change amount of the high-sensitivity temperature sensor when an external temperature change amount is the same, which means that external temperature changes are sensitively sensed.

The first and second temperature-sensing parts of the high-sensitivity temperature sensor according to an embodiment of the present disclosure may have TCR of 0.05 $K^{-1}$ to 0.6 $K^{-1}$.

In summary, the stretchable substrate of the high-sensitivity temperature sensor according to an embodiment of the present disclosure thermally expands with increasing external temperature, and thus, gaps between cracks included in the first temperature-sensing part and the second temperature-sensing part increase, thereby being capable of sensing external temperature changes as resistance increases.

The high-sensitivity temperature sensor according to an embodiment of the present disclosure includes a stretchable substrate thermally expanding with increasing external temperature, and thus, has a higher TCR than existing temperature sensors, thereby being capable of sensitively sensing external temperature changes.

Hereinafter, the high-sensitivity temperature sensors manufactured according to an example and comparative examples of the present disclosure and evaluation results of the characteristics, such as temperature sensing effects, of the high-sensitivity temperature sensors are described.

In the following characteristic evaluation, a nanoparticle thin film including conductive nanoparticles surrounded with the second organic ligand was formed on the stretchable substrate as an example to evaluate resistance changes in the stretchable substrate according to thermal expansion and strain applied to cracks therein, and a high-sensitivity temperature sensor was manufactured as an example to evaluate resistance changes according to external temperature changes, and the accuracy of external temperature change detection.

Materials

Silver nitrate ($AgNO_3$, 99.9+%) was purchased from Alfa Aeser, Co.

Oleylamine (OAm, 70%), oleic acid (OA, 90%), EDT (≥98%), TBAB (≥99.0%), APTES (AP. 99%), (3-mercaptopropyl)trimethoxysilane (MPTS, 95%), toluene (99.8%), acetone (≥99.5%), acetonitrile (99.8%), isopropanol (IPA, 99.5%), methanol (99.8%), ethanol (≥99.5%), hexane (95%) and octane (99+%) were purchased from Sigma-Aldrich, Co.

Polydimethylsiloxane (PDMS) was purchased from Dow Corning Corporation.

Silver (Ag) paste (Model No. 16040-30) was purchased from Ted Pella.

EXAMPLE

Example 1

1. Silver Nanoparticle Synthesis 3.4 g of silver nitrate, 10.0 mL of oleylamine and 90.0 mL of oleic acid were fed into a 200 mL three-necked flask and mixed therein, followed by degassing at 70° C. for 1 hour.

After degassing, the reaction container was filled with nitrogen gas and heated to 180° C. at a temperature increase rate of 10° C. per 10 minutes.

After the temperature of the mixture reached 180° C., the mixture was cooled to room temperature in the atmosphere.

90 mL of toluene and 150 mL of ethanol were added to the cooled mixture, followed by obtaining synthesized silver nanoparticles (Ag NC) through centrifugation.

Next, the obtained silver nanoparticles were dispersed in hexane and degassed, followed by redispersing in octane at a concentration of 200 mg/mL, thereby preparing a silver nanoparticle solution surrounded with a first organic ligand.

2. Substrate Preparation

A PDMS substrate was cleaned by UV-ozone treatment for 30 minutes, and a hydroxyl group (—OH) was formed on a surface thereof.

Next, an APTES solution was applied to the PDMS substrate treated with UV-ozone and, within 1 second, spin-coating was performed at 3,000 rpm for 30 seconds. As a result, a self-assembled monolayer (SAM) was formed on the PDMS substrate.

3. Manufacture of Nanoparticle Thin Film

The synthesized silver nanoparticle solution was spin-coated on the PDMS substrate at 1000 rpm for 30 seconds.

To replace the organic ligand of the synthesized silver nanoparticles, the PDMS substrate was contained in EDT for 1 minute so that ligand substitution was realized. As a result, a nanoparticle thin film was manufactured.

Comparative Example 1

A nanoparticle thin film was manufactured in the same manner as in Example 1 except that a glass substrate was used instead of the PDMS substrate.

Example 2

A photoresist was applied to the nanoparticle thin film manufactured according to Example 1, i.e., the first nanoparticle layer, followed by etching a portion of the photoresist through photolithography.

Next, the synthesized silver nanoparticle solution was spin-coated on the photoresist at 1000 rpm for 30 seconds, followed by containing in a TBAB solution for 3 minutes. As a result, an electrode layer was manufactured. Next, a remaining photoresist was removed to form an electrode and a first temperature-sensing part.

Next, the synthesized silver nanoparticle solution was spin-coated on the electrode and the first temperature-sensing part at 1000 rpm for 30 seconds, followed by containing in an EDT solution for 1 minute to perform a ligand substitution process. Next, encapsulation was performed using PDMS to form a protective layer, thereby manufacturing a high-sensitivity temperature sensor.

Property Evaluation

FIG. 4 illustrates an image of a finite element method (FEM) simulation of a nanoparticle thin film according to an embodiment of the present disclosure which is substituted with 1,2-ethanedithiol (EDT) and, accordingly, includes cracks.

FIG. 4 illustrates a change in a crack structure when external temperature elevated from 298K to 299K in the case in which the nanoparticle thin film of Example 1 which had cracks formed in an orthogonal direction was formed on a PDMS substrate.

Referring to FIG. 4, it can be confirmed that the PDMS substrate thermally expands in all directions as external temperature increases, and thus, the nanoparticle thin film of Example 1 is deformed.

In particular, it can be confirmed that the highest strain is concentrated on cracks included in the nanoparticle thin film of Example 1 (red marks in FIG. 4).

This is because the silver nanoparticles and the PDMS substrate have different thermal expansion coefficients (TECs).

That is, strain is concentrated on crack interfaces of the nanoparticle thin film of Example 1 when external temperature is elevated and the PDMS substrate thermally expands, and thus, gaps between the crack interfaces are opened. This greatly changes the behavior of charges in the cracks, so that resistance is changed.

FIG. 5 illustrates a Scanning Electron Microscope (SEM) image of a cross section of a nanoparticle thin film according to an embodiment of the present disclosure.

Referring to FIG. 5, it can be confirmed that cracks formed in the nanoparticle thin film of Example 1 have finite lengths.

FIG. 6 illustrates a charge transfer path of a nanoparticle thin film according to an embodiment of the present disclosure.

Here, the thicknesses of arrows shown in FIG. 6 indicate the degree of charge transfer.

Referring to FIG. 6, it can be confirmed that the width of a crack formed in the nanoparticle thin film of Example 1 decreases from top to bottom.

It can be confirmed that charge transfer is not performed in a portion with the widest width of the crack formed in the nanoparticle thin film of Example 1 due to a too wide gap between the crack (topmost arrow).

A middle arrow shown in FIG. 6 indicates that charge transfer is somewhat performed due to a relatively narrow gap of a portion of the crack formed in the nanoparticle thin film of Example 1.

In addition, an arrow located at the bottom shown in FIG. 6 indicates that charge transfer is very smoothly performed in a portion in which cracks are hardly formed.

FIG. 7 illustrates an FEM simulation of the nanoparticle thin film of FIG. 5.

Referring to FIG. 7, it can be confirmed that external temperature elevates by 1 K as a gap between a crack in the nanoparticle thin film of Example 1 increases, and thus, strain is concentrated thereon.

It can be confirmed that, in a nanocrack having a relatively narrow gap, strain is less concentrated, compared to a crack having a wide gap.

FIG. 8 illustrates an FEM simulation image for a relative resistivity of the nanoparticle thin film of FIG. 5.

Referring to FIG. 8, it can be confirmed that high resistance is exhibited as a gap between a crack in the nanoparticle thin film of Example 1 increases.

Accordingly, it can be confirmed that there are difficulties in performing charge transfer as a gap between in a crack increases, so that high resistance is exhibited.

In addition, it can be confirmed that low resistance is exhibited as a gap between a crack in the nanoparticle thin film of Example 1 decreases. This indicates that charge transfer is smoothly performed than in the case in which a gap between a crack is wide, and thus low resistance is exhibited.

FIG. 9 illustrates current versus voltage of nanoparticle thin films according to a comparative example and an example of the present disclosure.

FIG. 9 illustrates measurement results of current versus voltage at external temperatures of 30° C. and 50° C. for the nanoparticle thin films of Comparative Example 1 and Example 1.

Referring to FIG. 9, it can be confirmed that, in the nanoparticle thin film of Example 1, current versus voltage (i.e., the reciprocal of resistance) at 50° C. (PDMS-EDT 50) is about 1,113% higher than the reciprocal of resistance at 30° C. (PDMS-EDT 30).

On the other hand, it can be confirmed that, in the nanoparticle thin film of Comparative Example 1, there is almost no difference between the reciprocal of resistance at 30° C. (Glass-EDT 30) and the reciprocal of resistance at 50° C. (Glass-EDT 50), and thus, the resistance in Comparative Example 1 is not changed although external temperature increases.

Accordingly, since the high-sensitivity temperature sensor according to an embodiment of the present disclosure includes the stretchable substrate, it can sensitively sense external temperature changes.

FIG. 10 illustrates resistance change versus temperature of nanoparticle thin films according to a comparative example and an example of the present disclosure.

FIG. 10 illustrates resistance change rates in Comparative Example 1 and Example 1 according to an external temperature change by 5 K. TCR may be calculated through a slope of a plotted graph.

Referring to FIG. 10, it can be confirmed that a resistance change rate rapidly increases with increasing external temperature in Example 1 (PDMS), whereas a resistance hardly changes in Comparative Example 1 (Glass).

It can be confirmed that TCR in Example 1 is $4.84 \times 10^{-1} \pm 3.95 \times 10^{-2}$ $K^{-1}$, which is much larger than TCR, $-1.85 \times 10^{-3} \pm 1.30 \times 10^{-4}$ $K^{-1}$, of Comparative Example 1.

Accordingly, the high-sensitivity temperature sensor according to an embodiment of the present disclosure has a very large TCR, thereby having excellent external temperature change sensing ability.

FIG. 11 illustrates resistance change versus repeated temperature change of nanoparticle thin films according to a comparative example and an example of the present disclosure.

FIG. 11 illustrates resistance change rates in the nanoparticle thin films of Comparative Example 1 and Example 1 when an external temperature is repeatedly elevated and lowered from 303 K to 323 K.

Referring to FIG. 11, it can be confirmed that a resistance in Example 1 (PDMS-EDT) greatly increases by 10.42 at an external temperature of 323 K, whereas a resistance in Comparative Example 1 (Glass-EDT) increases by merely 0.03.

Accordingly, since the high-sensitivity temperature sensor according to an embodiment of the present disclosure includes the stretchable substrate, it can sensitively sense external temperature changes, and exhibits a constant resistance change pattern even in repeated external temperature changes, thereby providing excellent durability and reliability.

FIG. 12 illustrates current versus voltage of a high-sensitivity temperature sensor according to an embodiment of the present disclosure.

Referring to FIG. 12, it can be confirmed that, in the high-sensitivity temperature sensor of Example 2, current versus voltage (i.e., the reciprocal of resistance) at an external temperature of 50° C. (PDMS-EDT 50) is significantly smaller than the reciprocal of resistance at 30° C. (PDMS-EDT 30).

Accordingly, it can be confirmed that the resistance of the high-sensitivity temperature sensor of Example 2 increases with increasing external temperature.

Accordingly, it can be confirmed that the high-sensitivity temperature sensor according to an embodiment of the present disclosure exhibits the same resistance change pattern as that of Example 1 and sensitively senses external temperature changes.

FIG. 13 illustrates atmospheric temperatures measured using a high-sensitivity temperature sensor according to an embodiment of the present disclosure.

FIG. 13 illustrates daily temperatures measured after attaching the high-sensitivity temperature sensor of Example 2 to a window. The resistance of the high-sensitivity temperature sensor of Example 2 was measured at 2 pm and 10 pm on May 25, 2018 and 3 pm on May 28, 2018, and converted into a temperature.

Referring to FIG. 13, it can be confirmed that external temperatures measured by the high-sensitivity temperature sensor of Example 2 are respectively 298K, 293K and 302K which correspond to actual temperatures provided by the Korea Meteorological Agency.

Accordingly, the high-sensitivity temperature sensor according to an embodiment of the present disclosure can sensitively sense external temperature changes, and can accurately sense external temperature changes according to resistance changes.

The high-sensitivity temperature sensor according to an embodiment of the present disclosure includes a stretchable substrate stretched by heat, so that the area of the stretchable substrate increases due to thermal expansion with increasing external temperature, gaps between cracks included in temperature-sensing parts are further opened, and the resistance of the high-sensitivity temperature sensor increases. External temperature changes can be sensitively sensed through resistance changes in the high-sensitivity temperature sensor.

According to an embodiment of the present disclosure, a photoresist can be applied to a nanoparticle layer due to chemical bonding formed between a ligand-substituted organic ligand and a photoresist, so that patterning can be performed through photolithography.

Since the high-sensitivity temperature sensor according to an embodiment of the present disclosure includes the stretchable substrate that thermally expands with increasing external temperature, the high-sensitivity temperature sensor has a higher TCR than those of existing temperature sensors, thereby being capable of sensitively sensing external temperature changes.

Although the present disclosure has been described through limited examples and figures, the present disclosure is not intended to be limited to the examples. Those skilled in the art will appreciate that various modifications, additions and substitutions are possible, without departing from the scope and spirit of the disclosure. Therefore, it should be understood that there is no intent to limit the disclosure to the embodiments disclosed, rather, the disclosure is to cover all modifications, equivalents, and alternatives falling within the spirit and scope of the disclosure as defined by the claims.

DESCRIPTION OF SYMBOLS

100: high-sensitivity temperature sensor
110: stretchable substrate
120: first nanoparticle layer
121: first temperature-sensing layer
130: photoresist
131: region where first temperature-sensing layer is exposed
132: region where photoresist remains
133: remaining photoresist
140: second nanoparticle layer
141: electrode layer
151: first electrode
152: second electrode
160: first temperature-sensing part
170: third nanoparticle layer
171: second temperature-sensing layer
180: second temperature-sensing part
190: protective layer
210: conductive nanoparticle
220: second organic ligand
230: inorganic ligand

What is claimed is:

1. A method of manufacturing a high-sensitivity temperature sensor, the method comprising:
   a step of forming a first nanoparticle layer, which includes conductive nanoparticles surrounded with a first organic ligand, on a stretchable substrate;
   a step of substituting the first organic ligand of the first nanoparticle layer with a second organic ligand to form a first temperature-sensing layer including cracks, wherein the first organic ligand and the second organic ligand are different from each other;
   a step of applying and etching a photoresist on the first temperature-sensing layer to form a region where the first temperature-sensing layer is exposed and a region where the photoresist remains;
   a step of forming a second nanoparticle layer, which includes the conductive nanoparticles surrounded with the first organic ligand, on the first temperature-sensing layer;

a step of substituting the first organic ligand of the second nanoparticle layer with an inorganic ligand to form an electrode layer;

a step of removing the region, where the photoresist remains, on the first temperature-sensing layer to form an electrode and a first temperature-sensing part;

a step of forming a third nanoparticle layer, which includes conductive nanoparticles surrounded with the first organic ligand, on the electrode and the first temperature-sensing part;

a step of substituting the first organic ligand of the third nanoparticle layer with the second organic ligand to form a second temperature-sensing layer, which includes cracks, and a second temperature-sensing part; and a step of forming a protective layer on the second temperature-sensing part.

2. The method according to claim 1, wherein the photoresist is applied to the first temperature-sensing layer by forming a chemical bond with the second organic ligand.

3. The method according to claim 1, wherein the stretchable substrate thermally expands with increasing external temperature, and the first and second temperature-sensing parts sense resistance increase in the high-sensitivity temperature sensor due to increase in gaps between the cracks.

4. The method according to claim 1, wherein the stretchable substrate comprises polydimethylsiloxane (PDMS).

5. The method according to claim 1, wherein the stretchable substrate is treated with UV-ozone and (3-aminopropyl) triethoxysilane (APTES).

6. The method according to claim 1, wherein the stretchable substrate has a coefficient of thermal expansion of $1.0 \times 10^{-4} K^{-1}$ to $1.0 \times 10^{-3} K^{-1}$.

7. The method according to claim 1, wherein the conductive nanoparticles comprise at least one of gold (Au), silver (Ag), copper (Cu), aluminum (Al), platinum (Pt), nickel (Ni), tungsten (W), and iron (Fe).

8. The method according to claim 1, wherein the first organic ligand comprises at least one of trioctylphosphineoxide (TOPO), octadecanol, oleic acid and oleylamine.

9. The method according to claim 1, wherein the second organic ligand comprises at least one of 3-mercaptopropionic acid (MPA), 1,2-ethanedithiol (EDT), ethylenediamine (EDA), benzenedithiol (BDT), pyridine, methanethiosulfonyl-galactoside (TGA) and propanedithiol (PDT).

10. The method according to claim 1, wherein the inorganic ligand comprises at least one of sulfur ions ($S^{2-}$), chlorine ions ($Cl^-$), bromine ions ($Br^-$), thiocyanate ions ($SCN^-$), iodine ions ($I^-$), disulfide ions ($HS^-$), tellurium ions ($Te^{2-}$), hydroxide ions ($OH^-$), boron tetrafluoride ions ($BF_4^-$) and hexafluorophosphate ions ($PF_6^-$).

* * * * *